United States Patent [19]

Scruggs et al.

[11] Patent Number: 5,030,519
[45] Date of Patent: Jul. 9, 1991

[54] TUNGSTEN CARBIDE-CONTAINING HARD ALLOY THAT MAY BE PROCESSED BY MELTING

[75] Inventors: David M. Scruggs, San Juan Capistrano; Gerald A. Croopnick, Trabuco Canyon, both of Calif.

[73] Assignee: Amorphous Metals Technologies, Inc., Irvine, Calif.

[21] Appl. No.: 513,762

[22] Filed: Apr. 24, 1990

[51] Int. Cl.⁵ .......................... C22C 1/00; C22C 32/00
[52] U.S. Cl. ...................................... 428/614; 420/64; 420/129; 420/583; 420/590
[58] Field of Search .................. 428/614; 420/64, 129, 420/583, 590

[56] References Cited

U.S. PATENT DOCUMENTS

| | | | |
|---|---|---|---|
| 2,124,538 | 7/1938 | Boyer | 420/64 |
| 3,539,192 | 11/1970 | Prasse | 428/614 |
| 3,948,613 | 4/1976 | Weill | 428/614 |
| 3,970,445 | 7/1976 | Gale et al. | 420/64 |
| 3,986,892 | 10/1976 | Quaas | 428/614 |
| 4,024,902 | 5/1977 | Baum | 420/73 |
| 4,374,900 | 2/1983 | Hara et al. | 428/614 |
| 4,526,618 | 7/1985 | Keshavan et al. | 420/431 |
| 4,557,981 | 12/1985 | Bergmann | 428/614 |
| 4,646,099 | 4/1987 | Sievers | 428/614 |
| 4,725,512 | 2/1988 | Scruggs | 428/678 |
| 4,731,253 | 3/1988 | DuBoise | 420/453 |

FOREIGN PATENT DOCUMENTS 63-26295 2/1988 Japan.

*Primary Examiner*—Theodore Morris
*Assistant Examiner*—David Schumaker
*Attorney, Agent, or Firm*—Gregory O. Garmong

[57] ABSTRACT

A matrix-bonded carbide-containing material of high hardness is prepared using a mixture containing a matrix alloy having a composition in weight percent of from about 15 to about 45 percent chromium, from 0 to about 3 percent silicon, from about 2 to about 6 percent boron, from about 3 to about 11 percent titanium (either as metal or as a compound), balance iron and impurities, and a mass of tungsten carbide particles, the tungsten carbide particles preferably being present in an amount of from about 15 to about 60 percent by weight of the total mixture and the matrix alloy preferably being present in an amount of from about 85 to about 40 percent by weight of the total mixture. The matrix alloy is melted to produce a flowable mixture having a liquid phase and solid tungsten carbide particles, and thereafter solidified. During melting, the tungsten carbide particle size is reduced by interaction with the liquid phase. The melting can be accomplished by a conventional melt casting procedure, or by welding or other technique that produces a liquid matrix phase. The fine tungsten carbide particles produced during melting exhibit little if any settling, so that the final solidified product is macroscopically homogeneous.

16 Claims, 2 Drawing Sheets

TUNGSTEN CARBIDE-CONTAINING HARD ALLOY THAT MAY BE PROCESSED BY MELTING

BACKGROUND OF THE INVENTION

This invention relates to metallurgical alloys and, more particularly, to a composite alloy containing hard tungsten carbide particles which may be processed by melting.

Many materials are subjected to wear or erosion during service in machinery, when they contact an environment containing particulate matter. A few examples from the thousands of wear-inducing situations include drill tools, pump impellers, and scraper blades. As the materials wear, increasing amounts are removed until the dimensions of the part become so reduced that it is no longer operable. The part must then be replaced or repaired, usually necessitating that the machinery be removed from service.

One of the ongoing quests in the metallurgical industry has been to identify and exploit materials that resist wear and erosion. An important class of wear-resistant materials includes metals and compounds that are very hard. These materials are useful because they physically resist the scraping action of the erosive environment.

The hardest materials that are commercially practical for large-scale use are compounds such as tungsten carbide. While such materials are very hard and hence wear resistant, they suffer from the drawback that they are usually also quite brittle. That is, even though the material can resist wear, it may fail prematurely through another mechanism such as thermal cycling that requires a degree of ductility for damage resistance. Also, it is difficult to form such compounds into a useful article shape because of their high melting points and low ductility.

To achieve a compromise between hardness and ductility that permits the formation of useful shapes, a class of composite materials has been developed wherein particles of the wear-resistant compound are embedded in a matrix of a more ductile alloy. These composite materials, sometimes called bonded carbides, thus contain two distinct and identifiable major phases, fine particles of the hard material that have low ductility, and a continuous, somewhat ductile phase that is less wear resistant than the hard particles. The most commonly used member of this class is tungsten carbide/metal composites that have tungsten carbide particles embedded in a cobalt, nickel, or metal alloy matrix.

These bonded carbide materials are formed by powder metallurgical techniques wherein particles of the hard phase are mixed with powders of the matrix phase. The two phases are pressed together at an elevated temperature below the melting point of the matrix phase in a hot pressing operation, or heated above the melting point of the matrix in a liquid phase sintering operation. The powders are thus brought into intimate contact as a single material, wherein the hard phase and the matrix each retains its own physical identity. Using powder mixing techniques, the relative amounts of the two phases can be adjusted over a wide range.

Unless the amount of the carbide phase is sufficiently great that it forms a rigid skeletal structure upon melting of the matrix, the bonded carbide materials cannot be formed by techniques that melt the matrix phase using presently available technology, because the hard particles are normally much denser than the matrix material and will sink in the melt. If the mixture is heated to a temperature above the melting point of the matrix but below the melting point of the hard particles, in those cases where a skeletal structure is not formed the hard particles settle because of their higher density, forming a layered structure that is carbide-enriched at the lowest points and carbide-depleted at the highest points. While a skeletal structure may be desirable in some instances, its formation prevents the free flow of the melted mixture, which is a desirable feature in most casting and welding operations, for example.

Material processing operations that include melting are common, and are one of the most economical and practical ways of forming useful structures. Melting operations include conventional casting, but also other techniques not commonly thought of as casting operations but in which melting occurs, such as welding. Welding is a preferred approach to forming hard facings of many wear-resistant materials to prevent erosion of underlying substrates or to repair damaged substrates, but unfortunately cannot be used for bonded carbide materials due to the necessity for flow and the resulting density segregation phenomenon. In existing approaches, if the fraction of carbide phase is sufficiently high to form a skeletal structure to prevent gravity-driven segregation, the melt will not readily flow. If the fraction of carbide phase is reduced to permit flow, gravity-driven segregation leads to an irregular and nonhomogeneous microstructure.

For many applications there is a need for a bonded carbide material that can be processed by operations that include melting of the matrix phase and free flowing movement of the melted composite. Cast wear-resistant parts and welded hard facings of such materials would then be practical. Such a material would desirably permit a variation of the content of the hard phase over a range of values and would have a matrix that is itself wear resistant to avoid undercutting of the hard particles in the wear-producing environment. The present invention fulfills this need, and further provides related advantages.

SUMMARY OF THE INVENTION

The present invention provides a composite material containing a dispersion of hard particles distributed throughout a wear-resistant but somewhat ductile matrix. The composite materials may be processed by operations that include the free-flow melting of the matrix material, such as casting or welding, without causing extensive macrosegregation of the hard particles under the influence of gravity. The hard particles are very fine in size, yielding a high degree of homogeneity throughout the matrix.

In accordance with the invention, a matrix-bonded carbide-containing composite material comprises a matrix having a composition of from about 15 to about 45 percent by weight chromium, from 0 to about 3 percent by weight silicon, from about 2 to about 6 percent by weight boron, from about 3 to about 11 percent by weight titanium, balance iron; and a dispersion of tungsten carbide in the matrix, the tungsten carbide being present in an amount of from about 15 to about 60 percent by weight of the total material and the matrix being present in an amount of from about 85 to about 40 percent by weight of the total material. (All percentages stated herein are by weight, unless indicated otherwise.)

This composite material is prepared from a mixture that is itself novel. In accordance with this aspect of the invention, a melting material has a composition consisting essentially of an alloy having a composition of from about 15 to about 45 percent by weight chromium, from 0 to about 3 percent by weight silicon, from about 2 to about 6 percent by weight boron, from about 3 to about 11 percent by weight titanium, balance iron; and a mass of tungsten carbide particles, the tungsten carbide particles being present in an amount of from about 15 to about 60 percent by weight of the total mixture and the matrix alloy being present in an amount of from about 85 to about 40 percent by weight of the total mixture. A preferred form for this material is as a hollow-cored wire or rod, which is a hollow wire body made of the metallic components with the tungsten carbide particles and possibly some of the metallic components packed into the interior of the wire. The overall composition of the wire body plus the material packed into the hollow interior is as specified above. This hollow-cored wire or rod is particularly well suited for welding applications such as hard facing. As the wire or rod is progressively melted, material of the correct composition is continuously added to the melt and frozen to the substrate.

The material of the invention is prepared and applied or formed into useful shapes by heating it to a temperature greater than the melting point of the matrix but below the melting point of the tungsten carbide, so that the matrix becomes a continuous molten and flowable phase. The melt is formed of the molten matrix and the unmelted and undissolved hard particles therein, but nevertheless is flowable so that it can be processed by casting. The temperature is then lowered to solidify the matrix, producing a completely solid structure. The resulting structure is a composite of tungsten carbide particles in a continuous metallic matrix that is itself quite hard and wear resistant but has a degree of ductility.

The melting of the matrix can be achieved in any manner that heats it above its melting point. Heating the ingredients in a crucible is one approach, followed by casting the flowable mixture into or through a mold. In another acceptable technique, a previously unmelted mixture of the ingredients is melted as a pool on the surface of a substrate that is to be provided with a wear-resistant coating, permitted to flow to some degree, and then allowed to solidify to form such a coating. This latter technique is called "welding" in the art.

However the melting is accomplished, two quite unexpected results are observed in the final solidified material. First, the particles of the tungsten carbide are significantly reduced in size as compared with their size prior to melting. For example, typical commercially available tungsten carbide powder material includes irregularly shaped particles having sizes in the 150-450 micrometer range. If such powder is mixed with the matrix alloy and the matrix melted, the resulting tungsten carbide particles are more regular in shape with a size in the range of tens of micrometers. A composite with an array of fine particles has the advantage that it is less susceptible to cracking and to matrix erosion during service than is a composite with coarse particles.

The second unexpected result is that the fine particles of tungsten carbide are distributed generally evenly through the matrix, even though the particles have a much higher density (about 15 grams per cubic centimeter) than the matrix (about 8 grams per cubic centimeter). The solidified structure does not exhibit a significant gradient of particle density from the top to the bottom. This type of macroscopically homogeneous structure permits the preparation of cast articles that are generally uniformly wear resistant throughout, and hard facing by weld application of a coating whose upper regions are hard and wear resistant. If the present approach is not followed and the tungsten carbide particles are permitted to settle to the interface between the weld deposit and the underlying substrate, the interface tends to be brittle and subject to premature failure. The present approach avoids settling and such a premature failure mode.

The present invention has important commercial applications. Weld-coating or casting of a wear-resistant material having fine particles of tungsten carbide dispersed uniformly throughout a tough, wear-resistant matrix is now possible. It is not otherwise known to prepare such a uniform coating or casting with existing technology. The tungsten carbide content can be adjusted over a wide range to provide specific material properties, but in all cases the mixture of matrix alloy and tungsten carbide is flowable at temperatures above the melting temperature of the matrix. That is, no tungsten carbide skeleton is formed that would prevent free flow when the matrix is molten.

The present approach therefore produces a substantially improved material whose use is not limited to solid-state powder consolidation techniques, but which can be formed and applied by melting. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENTS

Figure 1:
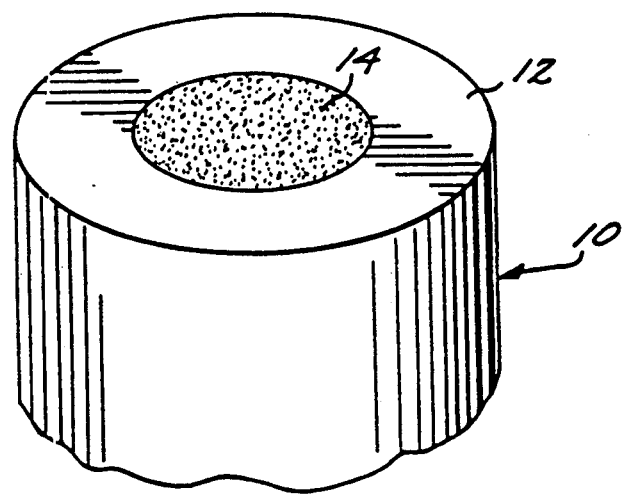
FIG. 1 is a perspective view of a hollow-core tube that is a preferred form of providing the material of the invention.

In accordance with the invention, a process for preparing a matrix-bonded carbide-containing composite material comprises the steps of providing a mixture containing a matrix alloy having a composition of from about 15 to about 45 percent by weight chromium, from 0 to about 3 percent by weight silicon, from about 2 to about 6 percent by weight boron, from about 3 to about 11 percent by weight titanium, balance iron, and a mass of tungsten carbide particles, the tungsten carbide particles being present in an amount of from about 15 to about 60 percent by weight of the total mixture and the matrix alloy being present in an amount of from about 85 to about 40 percent by weight of the total mixture; and melting the matrix alloy to form a free flowing mixture of metallic alloy and particles and thereafter solidifying the mixture.

More preferably, the chromium content is from about 24 to about 45 percent by weight of the matrix alloy; the silicon content is from about 1.2 to about 3 percent by weight of the matrix alloy; and the titanium content is from about 5 to about 8 percent by weight of the matrix alloy. More preferably, the tungsten carbide content is from about 18 to about 42 percent by weight of the entire mixture.

It is also permissible to add or otherwise have other ingredients in the composite material, as long as they do not interfere with the operability of the invention. For example, small amounts of manganese, molybdenum, or carbon, preferably less than 2 weight percent of manganese, 5 percent by weight molybdenum, and 1 weight percent of carbon, may be present in the composite material. Moderate amounts of the other iron-group elements, nickel and cobalt, are also commonly present. When the titanium is provided in a combined form such as titanium carbide, the amount of titanium in such combined form is included in the amount to be counted in the matrix, even though the titanium carbide may not be entirely melted. As the examples presented subsequently demonstrate, the titanium is surprisingly operable whether furnished as a pure metal, an alloy, or a compound.

In the most preferred approach for preparing the composite material of the invention, the ingredients are furnished and mixed together. The iron, chromium, silicon, boron, and titanium are usually provided in an unalloyed or, more preferably, a prealloyed form such as steel, ferrochromium, ferrosilicon, ferroboron, and ferrotitanium, all of which are commercially available in various compositions. Providing the elements in a prealloyed form reduces the time required to achieve a homogeneous matrix melt and the likelihood that unmelted portions of the matrix ingredients will be present in the final composite material, and reduces the cost of the alloying materials. Also, pure titanium combines rapidly with air, and may pose a fire hazard. The use of prealloyed titanium avoids this concern.

The required elements are weighed out and mixed together. As noted previously, small amounts of impurity elements or minor additions of other elements do not prevent operability of the invention, and are permitted in the matrix. The present invention is operable in commercial applications where it is not economically practical to provide high purity ingredients, and therefore has been tested and established as operable with commercially available and priced ingredients.

Titanium forms borides and carbides which are hard and can provide additional hardness to the composite material, as well as being the source of titanium. In the case of the titanium carbide, the presence of the carbon in an amount sufficient to provide the required titanium has not been found detrimental. Nevertheless, the carbon does not substitute for, or remove the requirement for, the boron that must be present in the composite material.

The various required ingredients may be supplied as powders or larger pieces, except that the tungsten carbide is preferably provided as a powder. Because of the bonded carbide industry, tungsten carbide powder is readily available commercially. The size distribution of the tungsten carbide powder is not critical, due to the subsequent refinement of the size during the processing. In one typical commercially available tungsten powder, the tungsten carbide particles are irregular in shape and the majority have a size in the 180 to 425 micrometer range. The presence of larger or smaller particles is acceptable.

After the ingredients are mixed, the mixture is heated to a temperature such that a liquid matrix is formed. The temperature of melt formation is typically about 1200° C., but varies according to the exact composition of the matrix. However, at this temperature the tungsten carbide particles do not melt, and remain in the solid state. Thus, the melt is a flowable mixture of liquid matrix alloy and solid tungsten carbide. Equivalently, all or some of the matrix ingredients can be melted and the remaining ingredients of the composite material including the tungsten carbide added. Thus, for example, the matrix components can be melted and then the tungsten carbide particles sprinkled onto the surface and mixed into the melt, prior to solidification.

The heating and energy input that causes melting can be induced in any acceptable manner, including for example and not by way of limitation a furnace, an arc melter, a welder, a plasma arc, or a laser beam.

One of the candidate applications for the material of the invention is hard-faced coatings applied by welding to a surface of a substrate. In that case, the composite material is preferably supplied as a powder-cored wire or tube 10 formed by a hollow wire or tube body 12 with the interior 14 of the hollow portion filled with powder, as illustrated in FIG. 1. One approach to implementing this form of the invention is to form the body from the matrix alloy, and pack the interior with tungsten carbide powder. A more economical approach is to form the body of the wire or tube from an available and readily formable metallurgical alloy, and then pack the interior with tungsten carbide and metal powders selected such that the net composition of the powder-cored wire or tube is the desired composition of the invention. Since hollow tubes of many iron-based materials such as low-carbon steel and stainless steel are already available commercially, preparation of a wire or tube of this melting alloy composition requires that the proper wire or tube be purchased and filled with the powder mixture, and and drawn to size as necessary. Alternatively, the powder for the core can be placed upon a strip of the body material as the strip is folded into a cylindrical shape to form a container, and thereafter drawn to compact the powder. The powder-cored wire or tube is a convenient form for supplying the proper mix of materials commercially to ensure that consumers have the correct alloy composition.

The powder-cored wire or tube is remelted by the consumer using a welding instrument such as an arc welder or a laser beam directed against the material in contact with the surface of the substrate to be coated. Although the initial melting of the matrix alloy and addition of the hard carbide could be conducted on the substrate, that approach is not preferred because of the increased possibility of damage to the substrate if the melt is maintained molten for a long period of time, and the increased possibility of incomplete melting and mixing if the melt is not maintained molten for a sufficient period of time.

Figure 2:
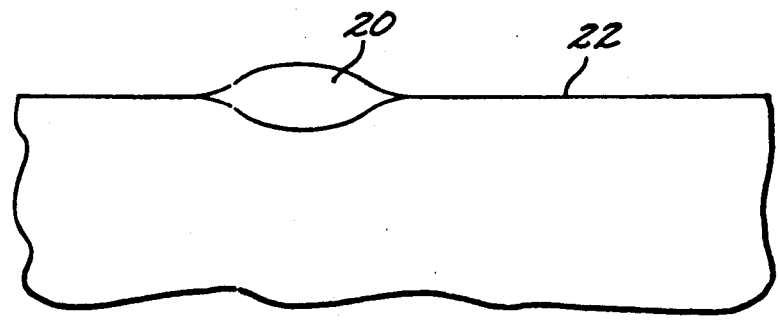
FIG. 2 is a side elevational view of a weld bead used to evaluate the materials of the invention.

FIG. 2 illustrates a typical hard-facing weld overlay bead 20 deposited on a substrate 22 by such an approach. The view is in cross section across the width of the bead 20. With automated welding apparatus, the bead 20 is normally continually deposited as the substrate 22 moves relative to a welding head (not shown), and the overlay material of the invention is continuously fed to the molten weld pool, which, after solidification, forms the bead 20. Thus, the bead 20 is extended in length in the direction normal to the plane of the illustration. A weld coating or overlay across the entire face of the substrate 22 is formed by depositing a sequence of the beads 20 in a side-by-side fashion.

Figure 3:
FIG. 3 is an enlarged photomicrograph of a portion of a welded overlay such as in FIG. 2 prepared in accordance with the present invention.
Figure 4:
FIG. 4 is an enlarged photomicrograph of a portion of a welded overlay similar to that of FIG. 2, except that the overlay alloy is not in accordance with the invention.

FIG. 3 is a photomicrograph of the weld bead 20 when formed by the approach of the invention, while FIG. 4 is a photomicrograph of the weld bead 20 when not formed by the approach of the invention. The white areas in the photographs are the tungsten carbide particles. In both cases, the tungsten carbide starting material was in the form illustrated in FIG. 4, where the particle size is about 180–425 micrometers. Where a matrix composition not in accordance with the invention is used, as with the steel matrix of FIG. 4, the titanium carbide particles exhibit an uneven size and macroscopic distribution. Where a matrix composition in accordance with the invention (specifically for FIG. 3, that of Example 1 below) is used, the particles are much finer and more homogeneously distributed.

The matrix alloying elements, their numerical values, and their interrelation to each other are carefully chosen to attain the desirable results of the invention. The use of chromium, silicon, and boron in the specified ranges provide a solidified matrix alloy that is hard and wear resistant in its own right. Chromium is present in an amount of from about 15 to about 45 weight percent, preferably from about 24 to about 45 weight percent, of the weight of the matrix. If too little chromium is used, the matrix has insufficient strength and toughness, and wears away too rapidly in erosion conditions. If too much chromium is used, the matrix becomes brittle and the alloy becomes overly expensive.

Silicon is present in an amount of from 0 to about 3 weight percent of the weight of the matrix, preferably from about 1.2 to about 3 percent. The alloy composition with no or little silicon is operable to produce the tungsten carbide particles of reduced size. However, if the silicon content is below about 1.2 percent by weight of the matrix, the morphology of the borides in the matrix is undesirably dendritic rather than separated and distributed generally evenly throughout the matrix. The result of too little silicon (below about 1.2 percent by weight) is increased brittleness of the matrix. If the silicon content is above about 3 percent, the matrix tends to become brittle.

Boron is present in an amount of from about 2 to about 6 weight percent of the weight of the matrix. If less than about 2 percent is present, the tungsten carbide tends to dissolve into the matrix so that the beneficial effect of the tungsten carbide is lost. Moreover, at such low boron contents there are insufficient borides in the matrix to provide high hardness. If more than about 6 percent is present, too high a fraction of borides is formed and the matrix becomes unacceptably brittle without any appreciable increase in hardness and wear resistance.

Titanium is present in an amount of from about 3 to about 11 weight percent of the weight of the matrix. If the titanium content is less than about 3 percent, the refinement of tungsten carbide size occurs only incompletely at best, and gravity-driven segregation of the large tungsten carbide particles is observed. If the titanium content is more than about 11 percent, the hardness and wear resistance of the matrix are reduced to an unacceptably low level.

The titanium can be added as the metal, but this is not preferred because of the tendency of titanium to ignite in air or oxygen. More preferably, the titanium is added as an alloy with another of the ingredients or as a compound. Alloys containing titanium, such as ferrotitanium, are commercially available. The titanium can also be added as a compound such as titanium carbide or titanium boride. As such, the final composite material may have some alloyed titanium present in the matrix, but most of the titanium will be present as the undissolved titanium carbide or titanium boride compound. Although the titanium has been discussed herein as a component of the matrix, it is intended that titanium in such a compound form be counted as though it were in the matrix for determination of the total percentage present. Thus, for example, when the quantitative limit of titanium is specified as from about 3 to about 11 weight percent, that figure includes titanium both in solution and in the form of a compound.

The balance of the matrix is primarily iron. As discussed previously, small amounts of other elements commonly found in commercial alloying materials and in steels are acceptable as long as they do not adversely affect the operability of the invention. For example, up to about 2 weight percent of manganese, 5 weight percent of molybdenum, and 1 weight percent of carbon are not found to be detrimental. Moderate amounts of nickel and cobalt, the other iron-group elements that behave similarly to iron, may be present without adversely affecting the present material.

The tungsten carbide is preferably from about 15 to about 60 percent by weight of the material. (The composition of the matrix has been stated herein in terms of a matrix basis, but the tungsten carbide is stated in terms of the entire-material basis.) At least some tungsten carbide, more than zero, must be present in the material to achieve the benefits of its hardness and wear resistance, and to realize the beneficial size reduction effect. These benefits are achieved for even low tungsten carbide contents. However, if the tungsten carbide is present in an amount of less than about 15 percent by weight of the matrix, the improvement of properties achieved by the material is typically not great enough to justify its presence. If the tungsten carbide is present in an amount of more than about 60 percent by weight of the material, the fluidity of the melt is too low for efficient casting and welding operations, probably due to the formation of a skeletal tungsten carbide structure upon melting. Thus, the invention is operable for all tungsten carbide contents of more than zero but less than 60 percent by weight of the material, but the tungsten carbide content is preferably from about 15 to about 60 percent by weight of the material.

The following examples are intended to illustrate aspects of the invention and its utility, and should not be taken as limiting of the invention in any respect.

EXAMPLE 1

A plasma non-transferred arc welding torch was used to melt a bead of a powder blend of the following composition in weight percent: 43.5 percent iron, 40.9 percent chromium, 5.3 percent boron, 1.7 percent silicon, and 8.6 percent titanium. To 70 parts by weight of this melt was added 30 parts by weight tungsten mono-carbide (WC) with a particle size of approximately 180–425 micrometers. The torch was moved steadily to achieve minimum heat input, and care was taken to ensure that after melting, solidification of the bead occurred rapidly. The bead had the general configuration illustrated in FIG. 2, with a maximum thickness of about 3 millimeters.

A section of the bead was sectioned and polished metallographically. The section was viewed metallographically in a scanning electron microscope, and a typical region is shown in FIG. 3. The section contained primarily blocky tungsten carbide particles approximately 2-6 micrometers in largest dimensions, in the alloy matrix. As an indicator of the success of the approach in reducing the size of the tungsten carbide particles, the number of particles having a maximum dimension of greater than 20 micrometers was counted (zero being the preferred result). An average of three such large particles per specimen was counted. The Rockwell A hardness of the bead was measured as 80.5. No cracking was evident in the sections.

EXAMPLE 2

Comparative

The procedure of Example 1 was followed, except that the matrix alloy was a steel of composition 0.02 weight percent carbon, 0.2 weight percent molybdenum, balance iron, a composition outside the scope of the invention. FIG. 4 illustrates a typical cross section of the bead. The difference in the size, distribution, and morphology of the tungsten carbide particles is evident, as compared with the structure shown in FIG. 3.

EXAMPLES 3-11

A series of beads were prepared using the same approach as discussed in Example 1, with the exception that the bead of Example 7 was prepared with a gas-metal arc (also known as metal inert gas or MIG) welder. The compositions of Examples 3-7 were within the scope of the invention, and the compositions of Examples 8-11 were not within the scope of the invention. Table I presents the weighed compositions of the matrix and hard phase, and Table II presents test results of the type discussed in relation to Example 1.

TABLE I

| Example | Matrix Chemistry (Weight Percent) | % Hard Phase WC | Other |
|---|---|---|---|
| 3 | 42.4 Fe, 44.8 Cr, 5.7 B, 7.1 Ti (provided as FeTi) | 30 | — |
| 4 | 46.3 Fe, 41.7 Cr, 5.4 B, 1.8 Si, 4.8 Ti (as FeTi) | 42 | — |
| 5 | 47.5 Fe, 44.8 Cr, 5.8 B, 1.9 Si | 36 | 6 TiC |
| 6 | 47.5 Fe, 44.8 Cr, 5.8 B, 1.9 Si | 42 | 4 TiB$_2$ |
| 7 | 69.7 Fe, 24.3 Cr, 3 B, 1.5 Si, 1.4 Mn | 18 | 6 TiC |
| 8 | 45.9 Fe, 45.3 Cr, 3 B, 2.9 Si | 30 | 10 VC |
| 9 | 87.2 Fe, 45.3 Cr, 5.9 B, (Ti as FeTi) | 30 | — |
| 10 | 43.8 Fe, 46.8 Cr, 2.3 Si, 7.1 Ti (Ti as FeTi) | 30 | — |
| 11 | 42.1 Fe, 39.7 Cr, 5.1 B, 1.7 Si, 11.4 Ti | 30 | — |

In Table I, "FeTi" refers to ferrotitanium, a prealloyed form of iron and titanium having about 30 percent by weight of iron and 70 percent by weight of titanium. Examples 8-11 are outside the composition of the invention, with Example 8 having no titanium, Example 9 having no chromium, Example 10 having no boron, and Example 11 having too much titanium.

TABLE II

| Example | Avg. No. of Particles Of Size >20 Micrometer | R(A) |
|---|---|---|
| 3 | 2 | 84.2 |
| 4 | 12 | 84.6 |
| 5 | 4 | 85.7 |
| 6 | 17 | 83.3 |
| 7 | 6 | 84.8 |
| 8 | 27 | 75.3 |
| 9 | * | 82.3 |
| 10 | * | 71.4 |
| 11 | ND | 70.3 |

ND—Not determined
*For alloys so marked, the tungsten carbide dissolves into the matrix, so that no particles are visible.

The results indicate that the composite materials within the scope of the invention, Examples 1 and 3-7, had an average number of particles of size greater than about 20 micrometers below 20 per cross section, and a R(A) (Rockwell A) hardness value above about 83. Materials outside the scope of the invention either had much larger numbers of large particles or the WC particles alloyed with the matrix, and also had R(A) values below 83.

The present invention therefore provides a meltable composition containing a hard carbide in a matrix that does not segregate significantly due to density difference during melting, and which has enhanced microscopic structure and properties. Although a particular embodiment of the invention has been described in detail for purposes of illustration, various modifications may be made without departing from the spirit and scope of the invention. Accordingly, the invention is not to be limited except as by the appended claims.

What is claimed is:

1. A matrix-bonded carbide-containing composite material, comprising:
   a matrix having a composition of from about 15 to about 45 percent by weight chromium, from 0 to about 3 percent by weight silicon, from about 2 to about 6 percent by weight boron, from about 3 to about 11 percent by weight titanium, balance iron; and
   a dispersion of tungsten carbide in the matrix, the tungsten carbide being present in an amount of from about 15 to about 60 percent by weight of the total material and the matrix being present in an amount of from about 85 to about 40 percent by weight of the total material.

2. The material of claim 1, wherein the tungsten carbide is present in an amount of from about 18 to about 42 percent by weight of the total material.

3. The material of claim 1, wherein the chromium is present in an amount of from about 24 to about 45 percent by weight of the matrix.

4. The material of claim 1, wherein the titanium is present in an amount of from about 4 to about 8 percent by weight of the matrix.

5. The material of claim 1, wherein the titanium is present as a compound with another element.

6. The material of claim 1, wherein the boron is present in an amount of from about 5 to about 6 weight percent of the matrix.

7. The material of claim 1, wherein the silicon content is from about 1.2 to about 3 weight percent of the matrix.

8. The material of claim 1, wherein the matrix further includes less than about 2 percent by weight of at least one element selected from the group consisting manganese, cobalt, nickel, molybdenum, and carbon.

9. A process for preparing a matrix-bonded carbide-containing composite material, comprising the steps of:
    providing a mixture containing
        a matrix alloy having a composition of from about 15 to about 45 percent by weight chromium, from 0 to about 3 percent by weight silicon, from about 2 to about 6 percent by weight boron, from about 3 to about 11 percent by weight titanium, balance iron, and
        a mass of tungsten carbide particles, the tungsten carbide particles being present in an amount of from about 15 to about 60 percent by weight of the total mixture and the matrix alloy being present in an amount of from about 85 to about 40 percent by weight of the total mixture; and
    melting the matrix alloy to form a free flowing mixture of metallic alloy and particles, and thereafter solidifying the mixture.

10. The process of claim 9, wherein the titanium is provided in the form of a titanium alloy.

11. The process of claim 9, wherein the titanium is provided in the form of a titanium compound.

12. A composite material prepared by the process of claim 9.

13. A melting material having a composition consisting essentially of
    an alloy having a composition of from about 15 to about 45 percent by weight chromium, from 0 to about 3 percent by weight silicon, from about 2 to about 6 percent by weight boron, from about 3 to about 11 percent by weight titanium, balance iron; and
    a mass of tungsten carbide particles, the tungsten carbide particles being present in an amount of from about 15 to about 60 percent by weight of the total mixture and the matrix alloy being present in an amount of from about 85 to about 40 percent by weight of the total mixture.

14. The material of claim 13, wherein the melting material is provided as a hollow body having the mass of particles in the hollow center thereof, the net composition of the body and the mass of particles being that of the melting material.

15. The material of claim 13, wherein at least a portion of the titanium of the matrix alloy is provided in the form of a compound of titanium.

16. The material of claim 13, wherein at least a portion of the titanium of the matrix alloy is provided in the form of a compound selected from the group consisting of titanium carbide and titanium boride.

* * * * *